United States Patent
Kavak et al.

(10) Patent No.: US 7,139,593 B2
(45) Date of Patent: Nov. 21, 2006

(54) SYSTEM AND METHOD FOR IMPROVING PERFORMANCE OF AN ADAPTIVE ANTENNA ARRAY IN A VEHICULAR ENVIRONMENT

(75) Inventors: Adnan Kavak, Yarimca (TR); Joseph Cleveland, Richardson, TX (US)

(73) Assignee: Samsung Electronics Co., Ltd., Suwon (KR)

(*) Notice: Subject to any disclaimer, the term of this patent is extended or adjusted under 35 U.S.C. 154(b) by 698 days.

(21) Appl. No.: 10/023,199

(22) Filed: Dec. 14, 2001

(65) Prior Publication Data
US 2003/0114193 A1    Jun. 19, 2003

(51) Int. Cl.
*H04M 1/00* (2006.01)
(52) U.S. Cl. ............... 455/562.1; 455/115.1; 455/101
(58) Field of Classification Search .......... 455/562.1, 455/561, 63.1, 63.4, 575.7, 450, 452.2, 453, 455/571, 418, 420, 562, 101, 115.1, 517, 455/442, 522, 13.3; 370/341, 251, 252, 334, 370/277, 342
See application file for complete search history.

(56) References Cited
U.S. PATENT DOCUMENTS

| | | | |
|---|---|---|---|
| 6,031,831 A * | 2/2000 | Tan Boon et al. | 370/342 |
| 6,122,260 A * | 9/2000 | Liu et al. | 370/280 |
| 6,377,819 B1 * | 4/2002 | Gesbert et al. | 455/562.1 |
| 6,496,535 B1 * | 12/2002 | Xu | 375/219 |
| 6,615,024 B1 * | 9/2003 | Boros et al. | 455/67.14 |
| 6,671,499 B1 * | 12/2003 | Ylitalo et al. | 455/101 |
| 6,725,057 B1 * | 4/2004 | Boyle | 455/550.1 |
| 6,850,761 B1 * | 2/2005 | Pallonen | 455/437 |
| 6,870,808 B1 * | 3/2005 | Liu et al. | 370/203 |
| 2002/0013164 A1 * | 1/2002 | Leifer et al. | 455/562 |
| 2002/0090978 A1 * | 7/2002 | Petrus et al. | 455/562 |
| 2003/0064754 A1 * | 4/2003 | Wilson et al. | 455/562 |
| 2003/0087673 A1 * | 5/2003 | Walton et al. | 455/562 |

* cited by examiner

*Primary Examiner*—Duc Nguyen
*Assistant Examiner*—Dai Phuong (57) ABSTRACT

A system and method is disclosed for improving downlink performance of an adaptive antenna array in a vehicular environment. The system comprises a mobile station that has a first mobile antenna and a second mobile antenna. A spatial signature estimator associated with a base transceiver station obtains spatial signatures from signals from the first mobile antenna and from the second mobile antenna within an uplink interval. Correlation circuitry uses the spatial signatures to identify a least changing spatial signature to obtain an optimal downlink beamforming weight vector to be used in the transmission of a signal to the mobile station in the next downlink interval.

20 Claims, 5 Drawing Sheets

SYSTEM AND METHOD FOR IMPROVING PERFORMANCE OF AN ADAPTIVE ANTENNA ARRAY IN A VEHICULAR ENVIRONMENT

TECHNICAL FIELD OF THE INVENTION

The present invention is directed, in general, to wireless telecommunications networks and, more specifically, to a system and method for improving the downlink performance of an adaptive antenna array in a vehicular environment.

BACKGROUND OF THE INVENTION

The use of wireless networks has become increasingly widespread. A wireless mobile station (e.g., a cellular telephone) that is used within a moving vehicle may be moving relatively fast with respect to a base transceiver station (BTS). It is common for a wireless mobile station within a moving vehicle to reach speeds of thirty miles per hour (30 mph) to fifty miles per hour (50 mph) or more. When a wireless mobile station is moving relatively fast, the signal level received at the base transceiver station (BTS) fluctuates rapidly due to the fast fading of the wireless propagation channel. The rapid fluctuations of the received signal level are created as the vehicle that is carrying the wireless mobile station rapidly passes by signal scattering structures such as buildings, large vehicles, or geological formations.

For example, a wireless mobile station in a vehicle transmits a signal that may proceed along a direct uplink path to the base station for a few seconds and then be largely blocked by a building for a few seconds as the vehicle passes the building. During blockage of the signal on such a direct path, a signal from the mobile station may travel along an indirect path by scattering off one of these scattering objects. The scattering by an object causes a reduction of the signal strength received at the base station due to greater propagation distance and due to absorption of power by the scattering surface.

In another scenario, a direct path signal and a scattered path signal arrive at the base station to combine out of phase to decrease the received signal strength. As the vehicle moves further, a direct path signal and a scattered path signal arrive at the base station to combine in phase to increase the received signal strength. Signal strengths of various multi-paths of the signal on the uplink path rapidly increase and decrease in intensity as the vehicle continues to pass other buildings or structures.

In a similar manner, signal strengths of various multipaths of the signal from the base station to the mobile station (downlink path) rapidly increase and decrease in intensity as the vehicle continues to pass other buildings or structures. Those skilled in the art will recognize that fading of the signal in a vehicular environment can sometimes produce signal strength variations in excess of thirty decibels (30 dB) and significantly degrade system performance. Under such circumstances, many burst errors can occur within a relatively short time interval.

Several prior art techniques exist that are designed to alleviate this problem in existing traditional antenna systems (e.g., single antenna configuration, diversity antenna configuration). One such technique used in code division multiple access (CDMA) systems involves the use of convolutional coding and interleaving. Information bits at the mobile station are first encoded according to a coding scheme and then interleaved. The rate of the encoded bits is usually at least twice the rate of the information bits. The coded bits are then interleaved to spread the errors that are due to channel fading. At the receiver, the procedure is reversed. The coded bits are decoded and deinterleaved to obtain the information bits. However, this technique wastes available frequency bandwidth by introducing the extra redundant bits. Coding techniques are inefficient with respect to utilization of available bandwidth.

Space-time (ST) types of coding systems have been proposed for use with multiple antenna systems that are capable of achieving high bit rates within a bandwidth. These types of coding systems are well suited for low mobility environments such as indoor applications. However, they are not well suited for a mobile station within a vehicular environment where a mobile station moves rapidly with respect to a base transceiver station.

Another technique involves channel prediction and filtering. This technique predicts (i.e., estimates) the wireless channel using one of a variety of existing methods such as (1) blind estimation based on digital signal properties, (2) Kalman filtering based on signal correlation statistics, and (3) ray tracing based on electromagnetic wave propagation. This technique attempts to improve system performance by predicting the channel behavior and designing filters to eliminate the adverse effects of the channel. Channel prediction techniques require accurate modeling of the propagation environment and real time processing.

When an adaptive antenna array (AAA) is used at a base station transceiver, the spatial characteristics of the wireless channel are used to determine and evaluate the performance of the system. Similar to scalar propagation channels, the spatial channel characteristics of the wireless channel also fluctuate significantly due to fast fading when a mobile station is used within a vehicular environment. A spatial signature vector that includes spatial channel characteristics is used to describe the response of an antenna array to a mobile station. A spatial signature vector may also be referred to as a channel vector. For example, an "M by one" spatial signature vector for an antenna array with M antennas may take the form:

$$\vec{a} = \sum_{k=0}^{L-1} \alpha_k \cdot \vec{v}(\theta_k) \qquad (1)$$

where L is the number of multipath signals, $\alpha_k$ is a complex path attenuation or fading coefficient of the $k^{th}$ multipath signal, $\vec{v}(\theta_k)$ is a steering vector, and $\theta_k$ is a direction of arrival (DOA) of the $k^{th}$ multipath signal.

For fixed wireless applications, spatial signature vectors associated with each mobile station remain almost unchanged over time. An adaptive antenna array (AAA) system estimates the spatial signature of each mobile station from measurements made on the received uplink signal from the mobile station and then applies beamforming to each separate user signal, thereby increasing the capacity and improving the communication link quality and coverage.

As in the case previously described for non-adaptive antenna arrays, problems arise when a mobile station is moving relatively rapidly with respect to a base transceiver station. In such circumstances, the spatial signatures of the channel vary significantly within a short period of time for a mobile station. For example, the level-crossing rate of the amplitude vector for a mobile station traveling at twenty four kilometers per hour (24 kph) is greater than eighteen (18) per second. The amplitude change from the median power can approach negative thirty decibels (−30 dB).

There is, therefore, a need in the art for an improved system and method for improving uplink and downlink performance of an adaptive antenna array in a vehicular environment.

SUMMARY OF THE INVENTION

To address the deficiencies of the prior art, it is a primary object of the present invention to provide, for use in wireless network, a system and method for improving downlink performance of an adaptive antenna array in a vehicular environment.

The system comprises a mobile station that has a first mobile antenna and a second mobile antenna. A spatial signature estimator associated with a base transceiver station obtains spatial signatures from signals from the first mobile antenna and from the second mobile antenna within an uplink interval. Correlation circuitry uses the spatial signatures to identify a least changing spatial signature to obtain an optimal downlink beamforming weight vector for transmission of a signal to the mobile station in a next subsequent downlink interval.

The correlation circuitry of the present invention comprises a controller, a table for storing values of the spatial signatures, a first spatial correlator, a second spatial correlator, and a comparator. A downlink beamformer that is coupled to the controller receives the optimal beamforming weight vector from the controller. The downlink beamformer complex multiplies an incoming complex data stream with the downlink beamforming weight vector to generate a resulting complex data stream for transmission through the adaptive antenna array to the mobile station.

It is an object of the present invention to provide an improved system and method for improving the downlink performance and the uplink performance of an adaptive antenna array in a vehicular environment.

It is also an object of the present invention to provide an improved system and method for obtaining spatial signatures from signals received from a mobile station to identify a least changing spatial signature to obtain an optimal downlink beamforming weight vector.

It is another object of the present invention to provide an improved system and method for providing a spatial signature estimator that is capable of obtaining a first set of spatial signatures and a second set spatial signatures within an uplink interval.

It is another object of the present invention to provide an improved system and method for providing correlation circuitry that is capable of correlating spatial signatures from signals from a first mobile antenna and signals from a second mobile antenna of a mobile station to determine a downlink beamforming weight vector.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
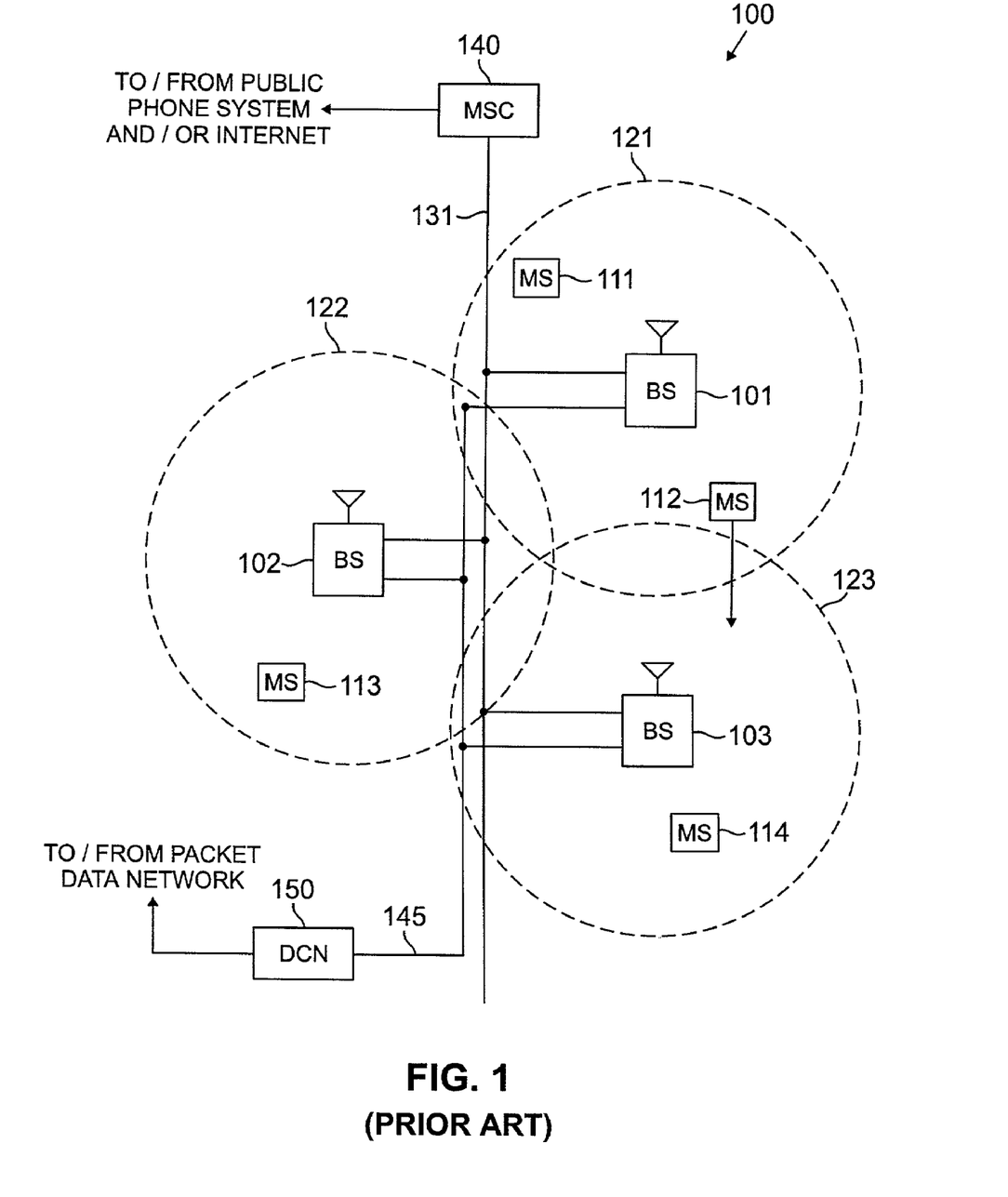
FIG. 1 illustrates an exemplary prior art wireless network.

FIG. 1 illustrates a general overview of an exemplary wireless network 100. The wireless telephone network 100 comprises a plurality of cell sites 121–123, each containing one of the base stations, BS 101, BS 102, or BS 103. Base stations 101–103 are operable to communicate with a plurality of mobile stations (MS) 111–114. Mobile stations 111–114 may be any suitable wireless communication devices, including conventional cellular telephones, PCS handsets, portable computers, telemetry devices, and the like, which are capable of communicating with the base stations via wireless links.

Dotted lines show the approximate boundaries of the cell sites 121–123 in which base stations 101–103 are located. The cell sites are shown approximately circular for the purposes of illustration and explanation only. It should be clearly understood that the cell sites also may have irregular shapes, depending on the cell antenna configuration selected, antenna height, and natural and man-made obstructions.

Each of the base stations BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers, as well as call processing circuitry. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public telephone system and/or the Internet. Communications line 131 links each vocoder in the base station controller (BSC) with switch elements in the mobile switching center (MSC) 140. In one advantageous embodiment, each link in communication line 131 provides a digital path for transmission of voice signals in the pulse code modulated (PCM) format. Communication line 131 may be any suitable connection means, including a T1 line, a T3 line, a fiber optic link, a network backbone connection, and the like. In some embodiments, communications line 131 may be several different data links, where each data link couples one of BS 101, BS 102, or BS 103 to MSC 140.

In another advantageous embodiment BS 101, BS 102 and BS 103 transfer data signals between each other and the Internet or other packet data network (not shown) via communications line 145 and data core network (DCN) server 150. Data core network (DCN) server 150 is well known to those skilled in the art. Data core network (DCN) server 150 is a packet data switching or routing device that provides services and coordination between the subscribers in a wireless network and external packet data networks, such as a corporate Ethernet system and/or the Internet. Those skilled in the art will understand that line 145 interfaces to a packet data serving node (not shown) located in data core network 150. Communications line 145 may be any suitable connection line, including an Ethernet link, a T1 connection, a T3 line, a fiber optic link, a network backbone connection, and the like. In some embodiments, communications line 145 may comprise several different data links, where each data link couples one of BS 101, BS 102, or BS 103 to data core network (DCN) 150.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

As is well known to those skilled in the art, a handoff transfers control of a call from a first cell to a second cell. In one advantageous embodiment, as MS 112 moves from cell 121 to cell 123, MS 112 determines that a handoff is required based on detection of a control signal from BS 103, increased bit error rate on signals from BS 101, signal time delay, or some other characteristic. When the strength of the control signal transmitted by BS 103, or the bit error rate of signals received from BS 101, or the round trip time delay exceeds a threshold, BS 101 initiates a handoff process by signaling MS 112 and the target BS 103 that a handoff is required. BS 103 and MS 112 proceed to negotiate establishment of a communications link. The call is thereby transferred from BS 101 to BS 103. An "idle" handoff is a handoff between cells of a mobile device that is communicating in the control or paging channel, rather than transmitting voice and/or data signals in the regular traffic channels.

One or more of the wireless devices in wireless network 100 may be capable of executing real time applications, such as streaming audio or streaming video applications. Wireless network 100 receives the real time data from, for example, the Internet through data core network (DCN) server 150 and through communications line 145 and transmits the real time data in the forward channel to the wireless device. For example, MS 112 may comprise a 3G cellular phone device that is capable of surfing the Internet and listening to streaming audio, such as music from the web site "www.mp3.com" or a sports radio broadcast from the web site "www.broadcast.com." MS 112 may also view streaming video from a news web site, such as "www.CNN.com." To avoid increasing the memory requirements and the size of wireless phone devices, one or more of the base stations in wireless network 100 provide real time data buffers that can be used to buffer real time data being sent to, for example, MS 112.

Figure 2:
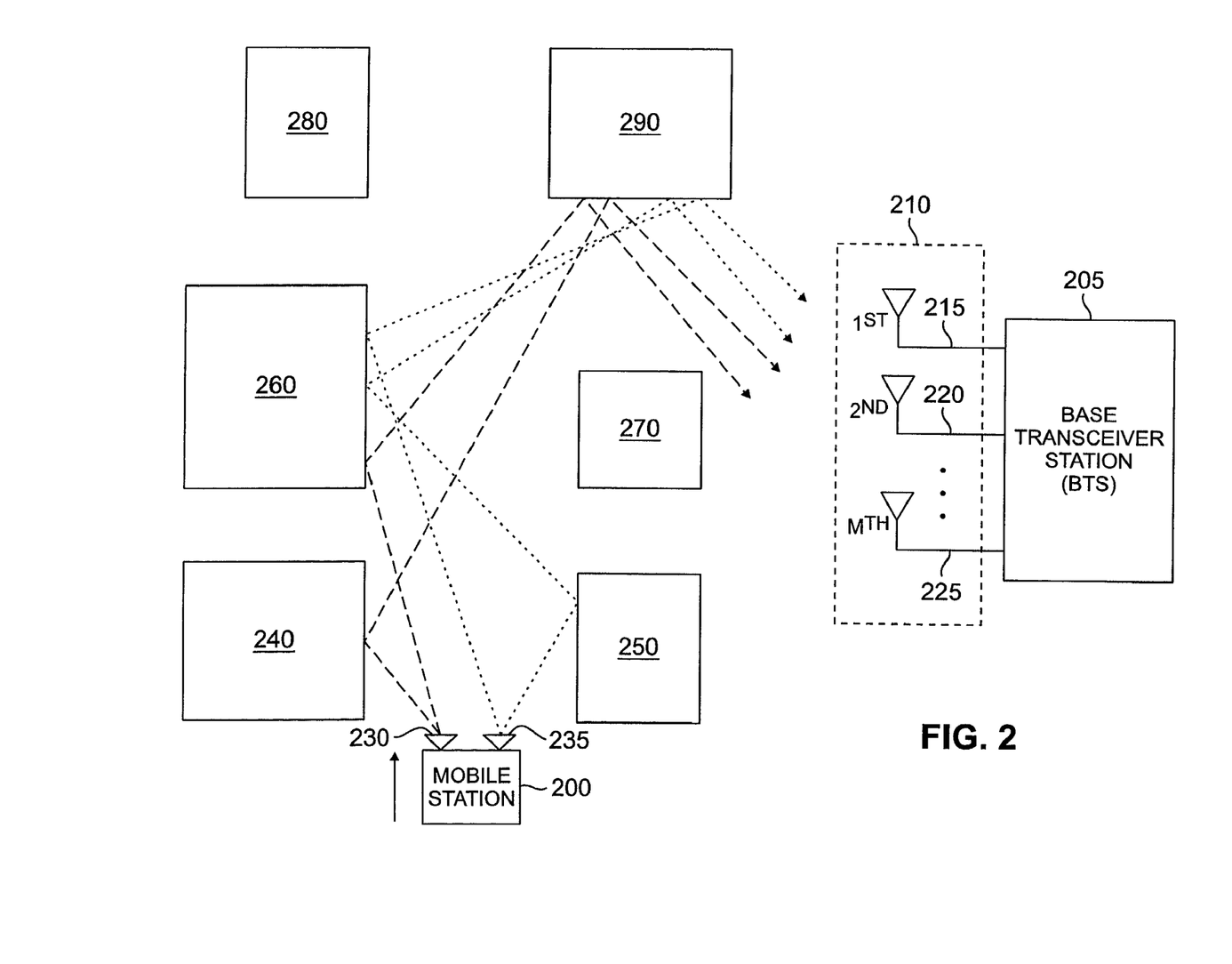
FIG. 2 illustrates a mobile station and a base transceiver station of the present invention and two sets of multipath signals from the mobile station to an antenna array of the base transceiver station as the mobile station moves between signal scattering structures.

FIG. 2 illustrates an exemplary mobile station 200 of the present invention and an exemplary base transceiver station 205 of the present invention. Base transceiver station 205 comprises an adaptive antenna array 210 comprising M antennas. As shown in FIG. 2, adaptive antenna array 210 comprises a first antenna 215, a second antenna 220, other antennas (not shown), and an $M^{th}$ antenna 215.

Mobile station 200 comprises a first mobile antenna 230 and a second mobile antenna 235. Blocks 240, 250, 260, 270, 280, and 290 represent signal scattering structures. Because a building is a common type of signal scattering structure, assume that blocks 240, 250, 260, 270, 280, and 290 represent buildings. The arrow to the left of mobile station 200 indicates that mobile station 200 is in motion and is moving forward between a first row of buildings on the left comprising buildings 250, 260 and 280 and a second row of buildings on the right comprising buildings 250, 270 and 290.

As shown in FIG. 2, a first signal transmitted from antenna 230 (shown with a large dashed line) scatters from building 240 and building 290. This signal path creates a first multipath from antenna 230 to adaptive antenna array 210. The first signal transmitted from antenna 230 (shown with a large dashed line) also scatters from building 260 and building 290. This signal path creates a second multipath from antenna 230 to adaptive antenna array 210.

A second signal transmitted from antenna 235 (shown with a small dashed line) scatters from building 260 and building 290. This signal path creates a first multipath from antenna 235 to adaptive antenna array 210. The second signal transmitted from antenna 235 (shown with a small dashed line) also scatters from building 250 and building 260 and building 290. This signal path creates a second multipath from antenna 235 to adaptive antenna array 210.

Antenna 230 and antenna 235 of mobile station 200 may be arranged in different configurations to exploit diversity in the multipath environment. For example, antenna 230 and antenna 235 may be spatially separated in a co-polarized configuration or in a cross-polarized configuration.

It has been experimentally demonstrated that using transmit diversity at a mobile station results in distinct spatial signature vectors at an antenna array of a base transceiver station when the communication paths are non-line-of-sight communication paths. (Kavak et al., "Mobile Transmit Diversity and TDD Downlink Performance for Smart Antennas in Fast Fading Scenarios," Proceedings of the IEEE, Symposium on Antennas and Propagation, July 2000.) Although multipath signals arriving at adaptive antenna array 210 from each mobile antenna, 230 and 235, have a similar direction of arrival (DOA), their complex path attenuations are different. This causes a distinct spatial signature vector to be associated with each mobile antenna, 230 and 235.

Base transceiver station 205 of the present invention employs an adaptive processing technique for selective downlink transmission in a time division duplex (TDD) scheme by exploiting the diversity that is provided by receiving transmissions from two separate antennas, 230 and 235, within mobile station 200. Although an advantageous embodiment of the present invention is shown and described as having two antennas, 230 and 235, it is clear that the present invention is not limited to the use of two antennas within mobile station 200. That is, the principles of the present invention extend to and include the use of three or more antennas within mobile station 200 and the analysis of a corresponding number of spatial signature vectors within base transceiver station 205.

Figure 3:
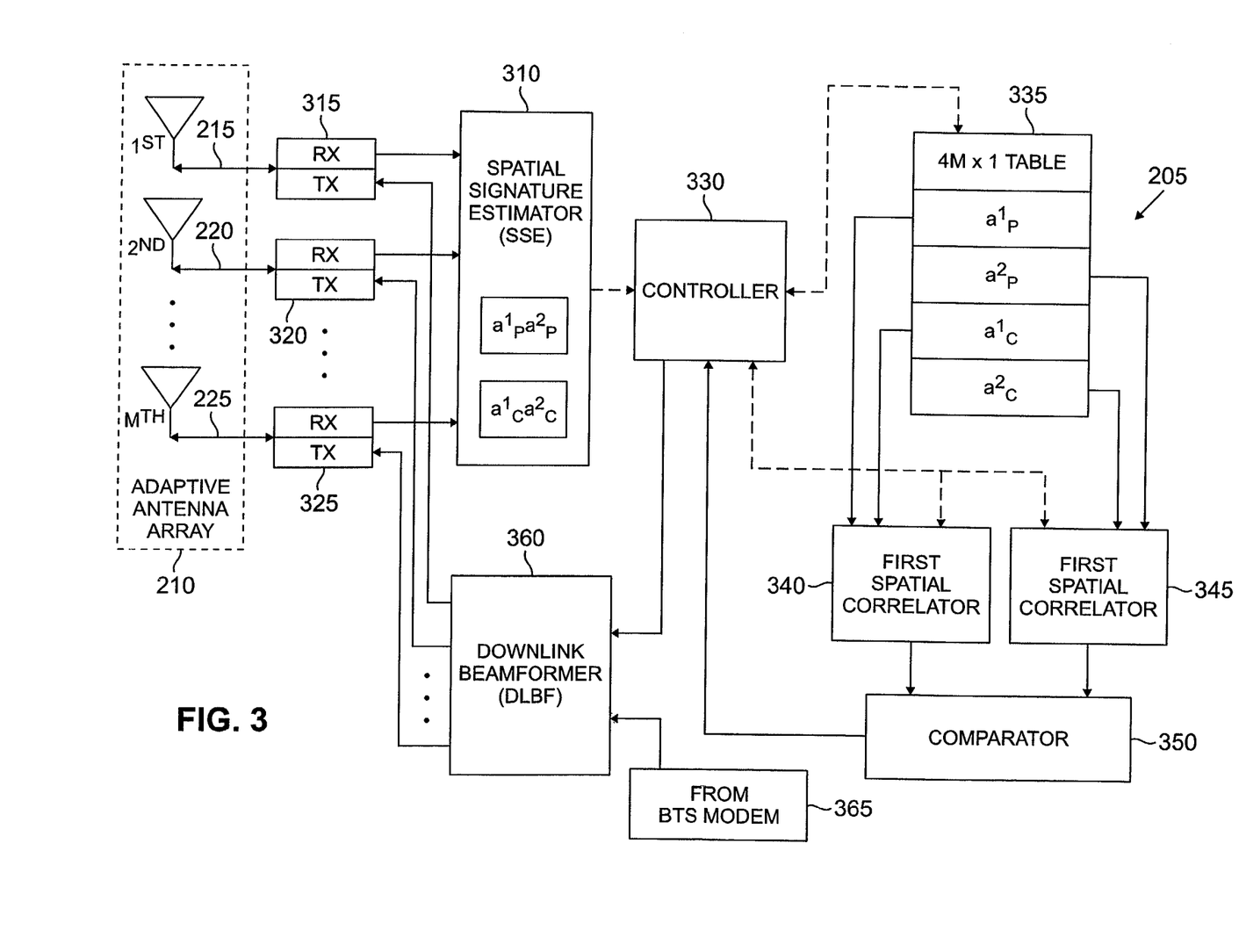
FIG. 3 illustrates a block diagram of a portion of the base transceiver station shown in FIG. 2 showing elements of the present invention.

As shown in FIG. 3, base transceiver station 205 comprises a spatial signature estimator (SSE) 310 that is capable of capturing spatial signatures vectors of the type previously described in Equation (1) from signals received in spatial signature estimator (SSE) 310. For convenience, the term "spatial signature" will be used to refer to a spatial signature vector. Spatial signature estimator 310 is coupled to and receives signals from the receive (RX) portions of transceivers 315, 320, . . . , 325 associated respectively with antennas 215, 220, . . . , 225 of adaptive antenna array 210.

Spatial signature estimator 310 is capable of employing more than one technique to capture spatial signatures from first mobile antenna 230 and second mobile antenna 235. For example, in a code division multiple access (CDMA) system, such as that described by TIA/EIA-95 or TIA/EIA 2000, first mobile antenna 230 and second mobile antenna 235 each transmit using different spreading codes. Spatial signature estimator 310 is capable of using the different spreading code information to obtain spatial signatures.

As also shown in FIG. 3, base transceiver station 205 also comprises controller 330, "4M by one" table 335, first spatial correlator 340, second spatial correlator 345, comparator 350, and down link beam former (DLBF) 360. Each of M outputs of down link beam former (DLBF) 360 are coupled to the transmit (TX) portions of transceivers 315, 320, . . . , 325 associated respectively with antennas 215, 220, . . . , 225 of adaptive antenna array 210.

Spatial signature estimator 310 in FIG. 3 captures a first spatial signature from first mobile antenna 230 (represented by the expression "$a^1_P$") and a first spatial signature from second mobile antenna 235 (represented by the expression "$a^2_P$") within an uplink interval (i.e., receive (RX) interval) of a time division duplex (TDD) slot associated with first mobile antenna 230 and second mobile antenna 235. The number "1" in the expression "$a^1_P$" refers to first mobile antenna 230. The number "2" in the expression "$a^2_P$" refers to second mobile antenna 235. The letter "P" refers to the first set of spatial signature measurements within the uplink interval.

At a later time within the same uplink interval spatial signature estimator 310 captures a second spatial signature from first mobile antenna 230 (represented by the expression "$a^1_C$") and a second spatial signature from second mobile antenna 235 (represented by the expression "$a^2_C$"). The number "1" in the expression "$a^1_C$" refers to first mobile antenna 230. The number "2" in the expression "$a^2_C$" refers to second mobile antenna 235. The letter "C" refers to the second set of spatial signature measurements within the uplink interval.

As will be more fully explained, base transceiver station 205 of the present invention comprises correlation circuitry that (1) measures the change in the second set of spatial signatures ("$a^1_C$" and "$a^2_C$") within respect to the first set of spatial signatures ("$a^1_P$" and "$a^2_P$"), and (2) employs the spatial signature with the least change as a beamforming weight vector during the next downlink interval (i.e., transmit (TX) interval) of a time division duplex (TDD) slot associated with first mobile antenna 230 and second mobile antenna 235.

Figure 4:
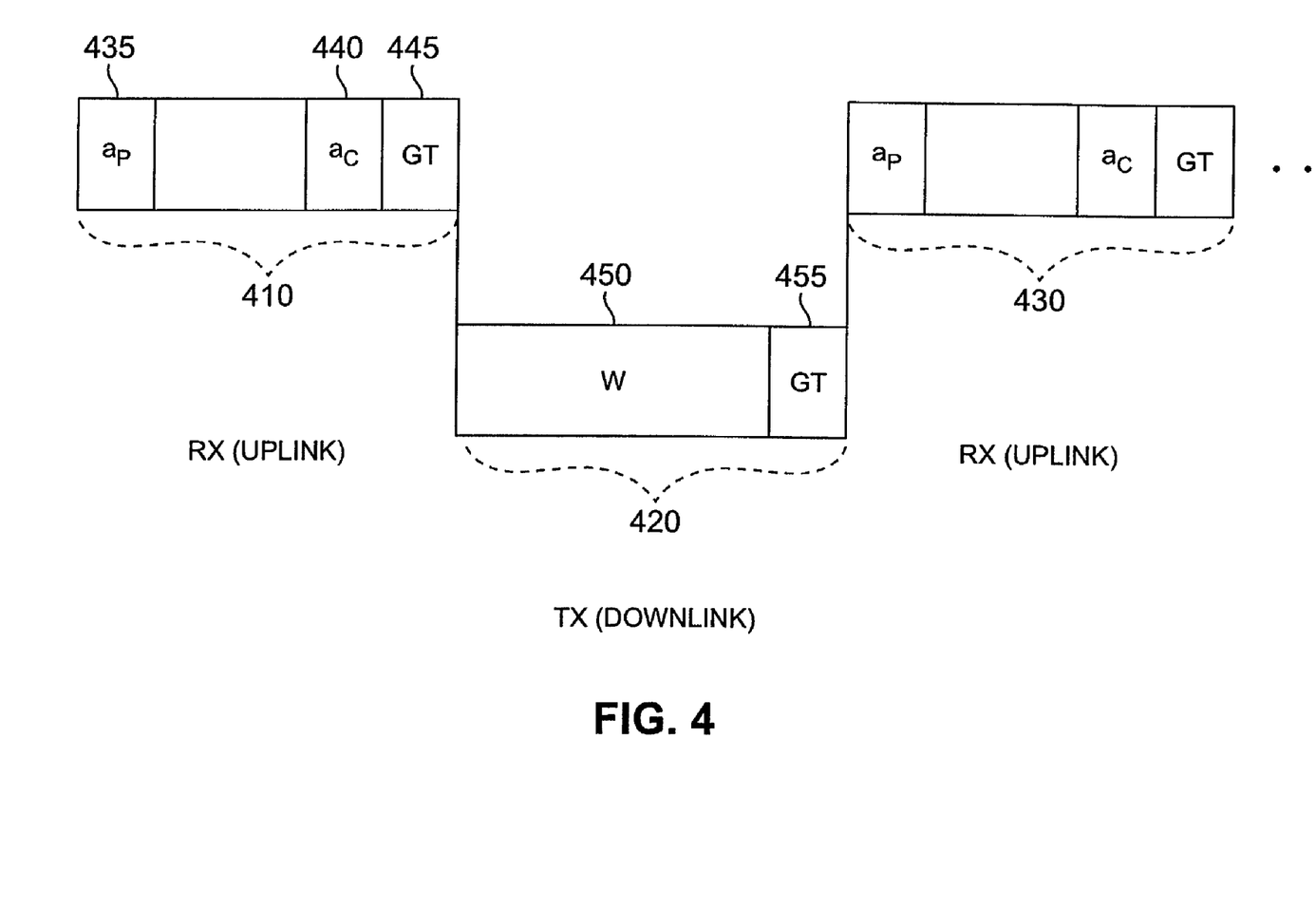
FIG. 4 illustrates a timing diagram of an uplink transmission showing a time of capture of a first and second set of spatial signatures and a timing diagram of a subsequent downlink transmission showing a time of transmission of a downlink beamforming weight vector.

FIG. 4 illustrates a timing diagram showing the temporal relationship of an uplink interval 410, a subsequent downlink interval 420, and a subsequent uplink interval 430. In one advantageous embodiment of the present invention, spatial signature estimator 310 captures the first set of spatial signatures ("$a^1_P$" and "$a^2_P$",) from an early portion 435 of uplink interval 410. Spatial signature estimator 310 then captures the second set of spatial signatures ("$a^1_C$" and "$a^2_C$") from a late portion 440 of uplink interval 410. The last portion 445 of uplink interval 410 labeled "GT" represents a "guard time" portion that immediately precedes downlink interval 420.

In one advantageous embodiment of the present invention, a typical length of time for uplink interval 410 is five hundred seventy six and nine tenths microseconds (576.9 ms). A typical length of time for portion 435 of uplink interval 410 is ten microseconds (10 ms). A typical length of time for portion 440 of uplink interval 410 is ten microseconds (10 ms). A typical length of time for the "guard time" interval 445 is two microseconds (2.0 ms). Those skilled in the art will recognize that these time values are given by way of example and that the present invention is not limited to these time values.

As soon as spatial signature estimator 310 obtains a spatial signature, spatial signature estimator 310 passes the spatial signature to controller 330. Controller 330 stores the spatial signatures in "4M by one" table 335. Controller 330 stores M spatial signatures from the M antennas in adaptive antenna array 210 within "M by one" consecutive locations within "4M by one" table 335. Therefore, "4M by one" table 335 is filled with the elements of 4M spatial signatures in the sequence "$a^1_P$", "$a^2_P$", "$a^1_C$" and "$a^2_C$".

Specifically, block "$a^1_P$" in "4M by one" table 335 contains M spatial signatures representing the first set spatial signatures obtained from first mobile antenna 230, one for each of the M antennas in adaptive antenna array 210. Block "$a^2_P$" in "4M by one" table 335 contains M spatial signatures representing the first set of spatial signatures obtained from second mobile antenna 235, one for each of the M antennas in adaptive antenna array 210. Block "$a^1_C$" in "4M by one" table 335 contains M spatial signatures representing the second set of spatial signatures obtained from first mobile antenna 230, one for each of the M antennas in adaptive antenna array 210. Lastly, block "$a^2_C$" in "4M by one" table 335 contains M spatial signatures representing the second set of spatial signatures obtained from second mobile antenna 235, one for each of the M antennas in adaptive antenna array 210.

After the first set of spatial signatures ("$a^1_P$" and "$a^2_P$") and the second set of spatial signatures ("$a^1_C$" and "$a^2_C$") have been obtained and stored within "4M by one" table 335, they are ready to be processed for downlink beamforming. Upon the start of downlink interval 420, controller 330 enables the operation of first spatial controller 340 and enables the operation of second spatial controller 345. Controller 330 enables "4M by one" table 335 to pass the spatial signatures that relate to first mobile antenna 230 (i.e., "$a^1_P$" and "$a^1_C$") to first spatial correlator 340. Controller 330 also enables "4M by one" table 335 to pass the spatial signatures that relate to second mobile antenna 235 (i.e., "$a^2_P$" and "$a^2_C$") to second spatial correlator 345.

First spatial correlator 340 calculates the magnitude of correlation between the spatial signatures "$a^1_P$" and "$a^1_C$". The correlation $\rho_1$ calculated by first spatial correlator 340 is given by the expression:

$$\rho_1 = |(\alpha^1_C)^*(\alpha^1_P)| \quad (2)$$

where the symbol * represents the well known process of correlation of two signals. The correlation $\rho_1$ measures how much the spatial signatures (also referred to as channel vectors) that are associated with first mobile antenna 230 vary when mobile station 200 is moving.

Similarly, second spatial correlator 345 calculates the magnitude of correlation between the spatial signatures "$a^2_P$" and "$a^2_C$". The correlation $\rho_2$ calculated by second spatial correlator 345 is given by the expression:

$$\rho_2 = |(\alpha^2_C)^*(\alpha^2_P)| \quad (3)$$

where the symbol * represents the well known process of correlation of two signals. The correlation $\rho_2$ measures how much the spatial signatures (also referred to as channel vectors) that are associated with second mobile antenna 235 vary when mobile station 200 is moving.

First spatial correlator 340 provides the value of the correlation $\rho_1$ to comparator 350. Similarly, second spatial correlator 345 provides the value of the correlation $\rho_2$ to comparator 350. Comparator 350 compares the two correlation values to determine downlink beamforming coefficients. Comparator 350 outputs a value that is equal to one (1) or is equal to zero (0). The output of comparator 350 is designated with the letter Z. Comparator 350 outputs a Z value of zero (0) if correlation value $\rho_1$ is greater than or equal to $\rho_2$. Comparator 350 outputs a Z value of one (1) if correlation value $\rho_1$ is less than $\rho_2$.

Thus comparator 350 performs the function:

$$Z=0 \text{ if } \rho_1 \geq \rho_2 \quad (4)$$

$$Z=1 \text{ if } \rho_1 < \rho_2 \quad (5)$$

Comparator 350 provides the value of Z to controller 330.

Controller 330 selects $W=\alpha^1_C$ as a downlink beamforming weight vector if the Z value of the output of comparator 350 is zero (0). Controller 330 selects $W=\alpha^2_C$ as a downlink beamforming weight vector if the Z value of the output of comparator 350 is one (1). Controller 330 then feeds the M downlink beamforming coefficients of downlink beamforming weight vector W to downlink beamformer (DLBF) 360.

Controller 330, "4M by one" table 335, first spatial correlator 340, second spatial correlator 345, and comparator 350 are generally referred to as the "correlation circuitry" of the present invention.

Downlink beamformer (DLBF) 360 also receives an incoming complex data stream $S=S_I+jS_Q$ from a base transceiver station (BTS) modem line 365. The expression $S_I$ represents the real part of complex data stream S and the expression $S_Q$ represents the imaginary part of complex data stream S. The incoming complex data stream S is complex multiplied with the downlink beamforming weight vector W. The result is:

$$X_I = \lfloor W^1_I W^2_I \ldots W^M_I \rfloor^T S_I \quad (6)$$

and $$X_Q = \lfloor^1_Q W^2_Q \ldots W^M_Q \rfloor^T S_Q \quad (7)$$

The resulting complex data stream $X=X_I+j X_Q$ is output from downlink beamformer (DLBF) 360 to the transmit (TX) portions of transceivers 315, 320, ..., 325 associated respectively with antennas 215, 220, ..., 225 of adaptive antenna array 210.

Because so little time passes between the time of acquisition of the second set of uplink spatial signatures ("$a^1_C$" and "$a^2_C$") and the time of downlink transmission, the propagation channel characteristics will be highly correlated. Therefore, by choosing the spatial signature that varies the least from the time of acquisition of the first set of uplink spatial signatures ("$a^1_P$" and "$a^2_P$"), the method of the present invention minimizes the performance degradation that is due to fast varying channel conditions caused by mobile station 200 moving at relatively fast speeds within a vehicle.

FIG. 4 illustrates a timing diagram for downlink interval 420. During a first portion 450 (designated "W") of downlink interval 420 base transceiver station 205 transmits a complex data stream X obtained by complex multiplying the incoming complex data stream S by the downlink beamforming weight vector W. The last portion 455 of downlink interval 420 labeled "GT" represents a "guard time" portion that immediately precedes the next uplink interval 430.

In one advantageous embodiment of the present invention, a typical length of time for downlink interval 420 is five hundred seventy six and nine tenths microseconds (576.9 ms). A typical length of time for first portion 450 of downlink interval 420 is ten microseconds (10 ms). A typical length of time for the "guard time" interval 455 is two microseconds (2 ms). Those skilled in the art will recognize that these time values are given by way of example and that the present invention is not limited to these time values.

Figure 5:
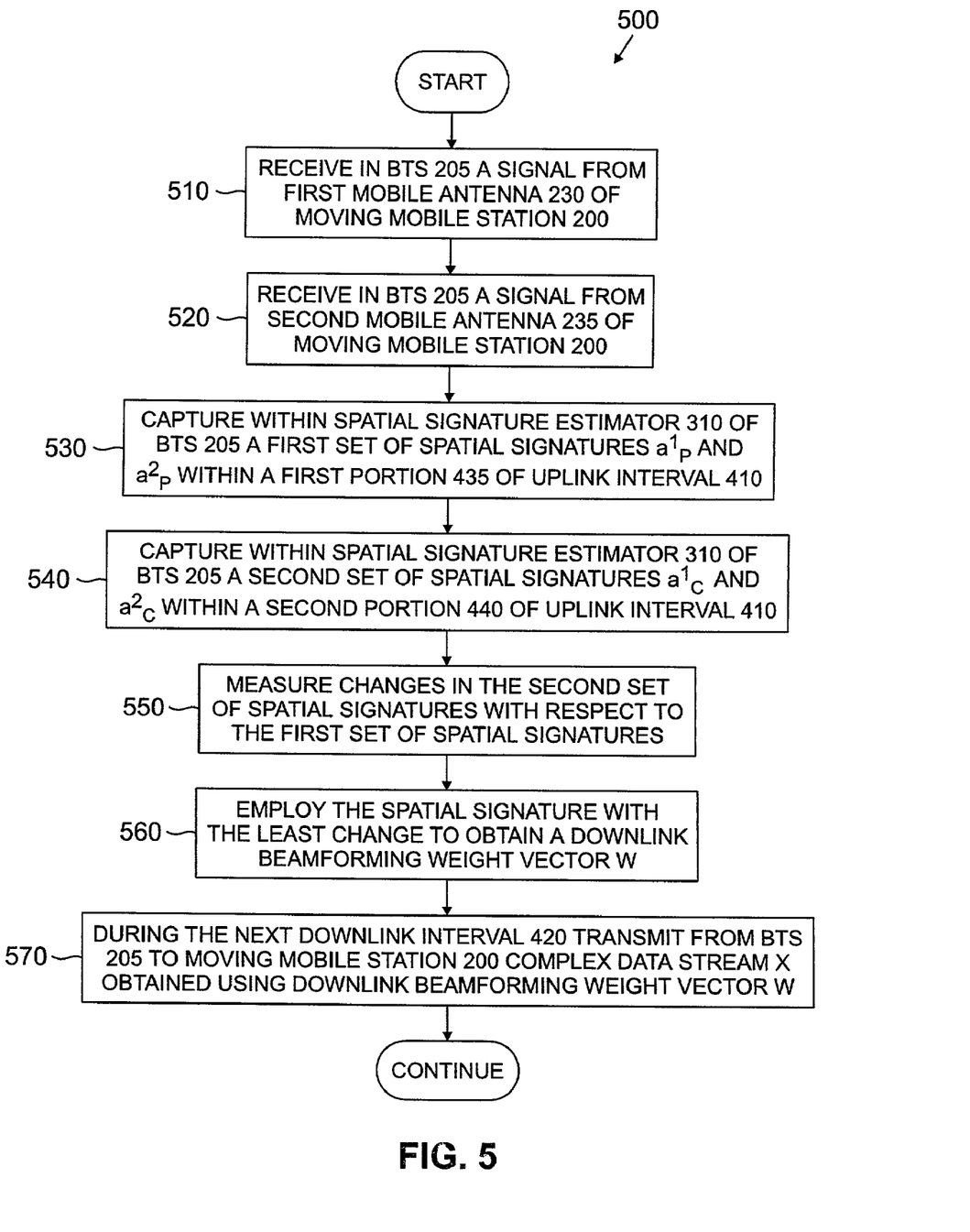
FIG. 5 illustrates a flow chart of an advantageous embodiment of a method of the present invention for improving downlink performance of an adaptive antenna array in a vehicular environment.

FIG. 5 illustrates a flowchart of one advantageous embodiment of a method of the present invention for improving the downlink performance of an adaptive antenna array in a vehicular environment. The steps of the method are generally denoted with reference numeral 500.

Base transceiver station 205 receives a signal from first mobile antenna 230 of moving mobile station 200 (step 510). Base transceiver station 205 also receives a signal from second mobile station 235 of moving mobile station 200 (step 520). Spatial signature estimator 310 within base transceiver station 205 captures a first set of spatial signatures ("$a^1_P$" and "$a^2_P$") within a first portion 435 of uplink interval 410 (step 530). Spatial signature estimator 310 within base transceiver station 205 captures a second set of spatial signatures ("$a^1_C$" and "$a^2_C$") within a second portion 440 of uplink interval 410 (step 540).

Then the changes in the second set of spatial signatures with respect to the first set of spatial signatures are measured (step 550). Downlink beamforming weight vector W is obtained by employing the spatial signature with the least change (step 560). During the next downlink interval 420 base transceiver station 205 transmits to moving mobile station 200 a complex data stream X that is obtained using the downlink beamforming weight vector W (step 570).

The present invention reduces the effect of fast channel variations and improves the downlink performance of adaptive antenna array in a vehicular environment. The present invention provides an apparatus and method for choosing a minimally changing uplink spatial signature to obtain a suitably appropriate downlink beamforming weight vector. The present invention uses the downlink beamforming weight vector to minimize the degradation of performance of an adaptive antenna array that is due varying downlink and uplink channels.

In an alternative advantageous embodiment of the present invention, base transceiver station 205 is capable of obtaining a downlink beamforming weight vector W by constructing a linear combination of spatial signatures associated with first mobile antenna 230 and second mobile antenna 235. In this alternative advantageous embodiment of the present invention, the size of "4M by one" table 335 is reduced to a "2M by one" size. The reduction in size is made at the expense of needing additional signal processing functions to combine the spatial signatures into an appropriate linear combination.

Although the present invention has been described in detail, those skilled in the art will understand that various changes, substitutions, and alterations herein may be made without departing from the spirit and scope of the invention it its broadest form.

What is claimed is:

1. For use in wireless network communications system comprising a base transceiver station having an adaptive antenna array and a mobile station having a first mobile antenna and a second mobile antenna, an apparatus for improving downlink performance of said adaptive antenna array of said base transceiver station, said apparatus comprising:

a spatial signature estimator associated with said base transceiver station, said spatial signature estimator operable to obtain a spatial signature from a signal received by said base transceiver station from said first mobile antenna and further operable to obtain a spatial signature from a signal received by said base transceiver station from said second mobile antenna; and correlation circuitry coupled to said spatial signature estimator, said correlation circuitry operable to use spatial signatures obtained from said first mobile antenna and from said second mobile antenna to identify a least changing spatial signature and further operable to use said least changing spatial signature to obtain a downlink beamforming weight vector.

2. The apparatus as set forth in claim 1 wherein said spatial signature estimator is operable to obtain a first set of spatial signatures comprising a first spatial signature from said first mobile antenna and a first spatial signature from said second mobile antenna during a first portion of an uplink interval of a time division duplex slot associated with said first mobile antenna and said second mobile antenna; and wherein said spatial signature estimator is operable to obtain a second set of spatial signatures comprising a second spatial signature from said first mobile antenna and a second spatial signature from said second mobile antenna during a second portion of said uplink interval; and wherein said correlation circuitry is operable to measure changes in said second set of spatial signatures with respect to said first set of spatial signatures to identify said least changing spatial signature.

3. The apparatus as set forth in claim 2 wherein said correlation circuitry comprises:

a controller;

a table coupled to said controller, said table operable to store values of said spatial signatures;

a first spatial correlator coupled to said controller and to said table, said first spatial correlator operable to correlate values of spatial signatures from said first mobile antenna;

a second spatial correlator coupled to said controller and to said table, said second spatial correlator operable to correlate values of spatial signatures from said second mobile antenna;

a comparator coupled to said controller and to said first spatial correlator and to said second spatial correlator, said comparator operable to compare correlation values from said first spatial correlator and from said second spatial correlator to determine a downlink beamforming weight vector.

4. The apparatus as set forth in claim 3 wherein said table is a 4M by one table operable to store values of said spatial signatures, where M is a number of antennas in said adaptive antenna array.

5. The apparatus as set forth in claim 4 wherein said 4M by one table contains:

M spatial signatures $a^1_P$ representing a first set of spatial signatures obtained from said first mobile antenna;

M spatial signatures $a^2_P$ representing a first set of spatial signatures obtained from said second mobile antenna;

M spatial signatures $a^1_C$ representing a second set of spatial signatures obtained from said first mobile antenna; and M spatial signatures $a^2_C$ representing a second set of spatial signatures obtained from said second mobile antenna.

6. The apparatus as set forth in claim 5 wherein said first spatial correlator calculates a correlation value $\rho_1$ between said spatial signatures $a^1_P$ and said spatial signatures $a^1_C$ given by:

$$\rho_1 = |(a^1_C)^*(a^1_P)|$$

where the symbol * represents a process of correlation of two signals.

7. The apparatus as set forth in claim 6 wherein said second spatial correlator calculates a correlation value $\rho_2$ between said spatial signatures $a^2_P$ and said spatial signatures $a^2_C$ given by:

$$\rho_2 = |(\alpha^2_C)^*(\alpha^2_P)|$$

where the symbol * represents a process of correlation of two signals.

8. The apparatus as set forth in claim 7 wherein said comparator compares said correlation value $\rho_1$ and said correlation value $\rho_2$;
wherein said comparator outputs to said controller a value of zero if said correlation value $\rho_1$ is greater than or equal to said correlation value $\rho_2$; and
wherein said comparator outputs to said controller a value of one if said correlation value $\rho_1$ is less than said correlation value $\rho_2$.

9. The apparatus as set forth in claim 8 wherein said controller selects said M spatial signatures $a^1_C$ as components of a downlink beamforming weight vector W if said output value from said comparator is one; and
wherein said controller selects said M spatial signatures $a^2_C$ as components of a downlink beamforming weight vector W if said output value from said comparator is zero.

10. The apparatus as set forth in claim 9 comprising a downlink beamformer coupled to said controller, said downlink beamformer operable to receive said downlink beamforming weight vector W from said controller, and operable to complex multiply an incoming complex data stream S with said downlink beamforming weight vector W, and operable to output a resulting complex data stream X to transmit portions of M transceivers associated respectively with M antennas of said adaptive antenna array.

11. For use in wireless network communications system comprising a base transceiver station having an adaptive antenna array and a mobile station having a first mobile antenna and a second mobile antenna, a method for improving downlink performance of said adaptive antenna array of said base transceiver station, said method comprising the steps of:
obtaining in a spatial signature estimator associated with said base transceiver station a spatial signature from a signal received by said base transceiver station from said first mobile antenna;
obtaining in said spatial signature estimator a spatial signature from a signal received by said base transceiver station from said second mobile antenna; and
using spatial signatures obtained from said first mobile antenna and from said second mobile antenna to identify a least changing spatial signature; and
using said least changing spatial signature to obtain a downlink beamforming weight vector.

12. The method as set forth in claim 11 further comprising the steps of:
obtaining in said spatial signature estimator a first set of spatial signatures comprising a first spatial signature from said first mobile antenna and a first spatial signature from said second mobile antenna during a first portion of an uplink interval of a time division duplex slot associated with said first mobile antenna and said second mobile antenna; and
obtaining in said spatial signature estimator a second set of spatial signatures comprising a second spatial signature from said first mobile antenna and a second spatial signature from said second mobile antenna during a second portion of said uplink interval; and
using correlation circuitry to measure changes in said second set of spatial signatures with respect to said first set of spatial signatures to identify said least changing spatial signature.

13. The method as set forth in claim 12 wherein said correlation circuitry comprises:
a controller;
a table coupled to said controller, said table operable to store values of said spatial signatures;
a first spatial correlator coupled to said controller and to said table, said first spatial correlator operable to correlate values of spatial signatures from said first mobile antenna;
a second spatial correlator coupled to said controller and to said table, said second spatial correlator operable to correlate values of spatial signatures from said second mobile antenna;
a comparator coupled to said controller and to said first spatial correlator and to said second spatial correlator, said comparator operable to compare correlation values from said first spatial correlator and from said second spatial correlator to determine a downlink beamforming weight vector.

14. The method as set forth in claim 13 further comprising the step of storing values of said spatial signatures in said table, wherein said table is a 4M by one table, where M is a number of antennas in said adaptive antenna array.

15. The method as set forth in claim 14 further comprising the steps of:
storing in said 4M by one table M spatial signatures $a^1_P$ representing a first set of spatial signatures obtained from said first mobile antenna;
storing in said 4M by one table M spatial signatures $a^2_P$ representing a first set of spatial signatures obtained from said second mobile antenna;
storing in said 4M by one table M spatial signatures $a^1_C$ representing a second set of spatial signatures obtained from said first mobile antenna; and
storing in said 4M by one M spatial signatures $a^2_C$ representing a second set of spatial signatures obtained from said second mobile antenna.

16. The method as set forth in claim 15 further comprising the step of:
calculating in said first spatial correlator a correlation value $\rho_1$ between said spatial signatures $a^1_P$ and said spatial signatures $a^1_C$ given by:

$$\rho_1 = |(\alpha^1_C)^*(\alpha^1_P)|$$

where the symbol * represents a process of correlation of two signals.

17. The method as set forth in claim 16 further comprising the step of:
calculating in said second spatial correlator a correlation value $\rho_2$ between said spatial signatures $a^2_P$ and said spatial signatures $a^2_C$ given by:

$$\rho_2 = |(\alpha^2_C)^*(\alpha^2_P)|$$

where the symbol * represents a process of correlation of two signals.

18. The method as set forth in claim 17 further comprising the steps of:
comparing said correlation value $\rho_1$ and said correlation value $\rho_2$ in said comparator;
outputting from said comparator to said controller a value of zero if said correlation value $\rho_1$ is greater than or equal to said correlation value $\rho_2$; and outputting from said comparator to said controller a value of one if said correlation value $\rho_1$ is less than said correlation value $\rho_2$.

19. The method as set forth in claim 18 further comprising the steps of:

selecting in said controller said M spatial signatures $a^1_C$ as components of a downlink beamforming weight vector W if said output value from said comparator is one; and selecting in said controller said M $a^2_C$ spatial signatures $a^2_C$ as components of a downlink beamforming weight vector W if said output value from said comparator is zero.

20. The method as set forth in claim 19 further comprising the steps of:

receiving in a downlink beamformer coupled to said controller said downlink beamforming weight vector W from said controller;

complex multiplying in said downlink beamformer an incoming complex data stream S with said downlink beamforming weight vector W;

outputting from said downlink beamformer a resulting complex data stream X to transmit portions of M transceivers associated respectively with M antennas of said adaptive antenna array.

* * * * *

UNITED STATES PATENT AND TRADEMARK OFFICE
CERTIFICATE OF CORRECTION

PATENT NO. : 7,139,593 B2  
APPLICATION NO. : 10/023199  
DATED : November 21, 2006  
INVENTOR(S) : Adnan Kavak and Joseph Cleveland Page 1 of 1

It is certified that error appears in the above-identified patent and that said Letters Patent is hereby corrected as shown below:

Column 9, delete Equation (2), and replace with -- $\rho_1 = |(a^1_c)*(a^1_p)|$ --;

Column 9, delete Equation (3), and replace with -- $\rho_2 = |(a^2_c)*(a^2_p)|$ --;

Column 10, line 10, delete "$w=\alpha^1_c$" and replace with -- $w=a^1_c$ --;

Column 10, line 12, delete "$w=\alpha^2_c$" and replace with -- $w=a^2_c$ --;

Column 12, claim 6, Line 64, delete the equation in claim 6 and replace it with -- $\rho_1 = |(a^1_c)*(a^1_p)|$ --;

Column 13, claim 7, delete the equation in claim 7 and replace it with -- $\rho_2 = |(a^2_c)*(a^2_p)|$ --;

Column 14, claim 16, delete the equation in claim 16 and replace it with -- $\rho_1 = |(a^1_c)*(a^1_p)|$ --;

Column 14, claim 17, delete the equation in claim 17 and replace it with -- $\rho_2 = |(a^2_c)*(a^2_p)|$ --; and Column 15, claim 19, line 10, delete "$a^2_c$" before the term "spatial".

Signed and Sealed this

Thirty-first Day of July, 2007

JON W. DUDAS  
*Director of the United States Patent and Trademark Office*